US012157161B2

(12) United States Patent
Pallanchard et al.

(10) Patent No.: US 12,157,161 B2
(45) Date of Patent: Dec. 3, 2024

(54) METHOD OF MANUFACTURING A FLANGE FOR HOLDING AN OUTER RING OF A ROLLING BEARING

(71) Applicant: NTN EUROPE, Annecy (FR)

(72) Inventors: Vincent Pallanchard, Annecy (FR); Louis Redoutey, Annecy (FR); Romain Thomas, Dingy-Saint-Clair (FR)

(73) Assignee: NTN EUROPE, Annecy (FR)

( * ) Notice: Subject to any disclaimer, the term of this patent is extended or adjusted under 35 U.S.C. 154(b) by 0 days.

(21) Appl. No.: 18/603,336

(22) Filed: Mar. 13, 2024

(65) Prior Publication Data

US 2024/0307949 A1  Sep. 19, 2024

(30) Foreign Application Priority Data

Mar. 17, 2023  (FR) ........................... 2302522

(51) Int. Cl.
  *B21D 53/10*  (2006.01)
(52) U.S. Cl.
  CPC .................................... *B21D 53/10* (2013.01)
(58) Field of Classification Search
  CPC ...................................................... B21D 53/10
  See application file for complete search history.

(56) References Cited

U.S. PATENT DOCUMENTS 3,806,214 A * 4/1974 Keiser ................. F16C 19/386
  384/589
5,237,748 A * 8/1993 Glinski ................ F16C 19/46
  29/898.063

(Continued)

FOREIGN PATENT DOCUMENTS

CN  108662028 A * 10/2018 ............. B21D 22/02
DE  102009004653 B4 * 3/2024 ............. B23P 11/00

(Continued)

OTHER PUBLICATIONS

English Translation of CN-108662028-A (Year: 2018).*
English Translation of DE-102009004653-B4 (Year: 2009).*
English Translation of WO-2014095829-A1 (Year: 2013).*

*Primary Examiner* — Jacob J Cigna
(74) *Attorney, Agent, or Firm* — Chiesa Shahinian & Giantomasi PC

(57) ABSTRACT

To manufacture a holding flange intended to be inserted into a groove of an outer ring of a rolling bearing, from a metal plate having a plate thickness measured between a front face and an opposite rear face of the metal plate, a method is performed in at least two steps. By penetration of a first tool, along a reference axis perpendicular to the plate and in a direction of penetration from the front face over an intermediate depth less than the plate thickness, the material initially located inside a front geometric envelope is pushed back into a volume axially located between the intermediate depth and the rear face of the holding flange and delimited by a blank geometric envelope. Next, by penetration of a second tool along the reference axis and in the direction of penetration, the plate is perforated to form a final bore having a rear geometric envelope located, in projection on a plane perpendicular to the reference axis, radially inside the front geometric envelope and outside the blank geometric envelope.

17 Claims, 6 Drawing Sheets

(56) References Cited

U.S. PATENT DOCUMENTS

| | | | | |
|---|---|---|---|---|
| 8,091,240 B2* | 1/2012 | Katougi | ................ | F16C 33/586 |
| | | | | 384/537 |
| 8,876,400 B2* | 11/2014 | Kanou | .................. | F16C 33/588 |
| | | | | 384/620 |
| 9,644,682 B2* | 5/2017 | Beck | ..................... | F16C 35/077 |
| 10,060,472 B2* | 8/2018 | Ishibashi | ................ | F16C 43/04 |

FOREIGN PATENT DOCUMENTS

| | | | | |
|---|---|---|---|---|
| FR | 3032500 B1 | | 3/2017 | |
| WO | WO-2014095829 A1 * | 6/2014 | ....... | B29C 45/14065 |

* cited by examiner

METHOD OF MANUFACTURING A FLANGE FOR HOLDING AN OUTER RING OF A ROLLING BEARING

CROSS-REFERENCE TO RELATED APPLICATIONS

This application claims the benefit of priority under 35 U.S.C. 119 to French Patent Application No. 2302522, filed Mar. 17, 2023; the disclosure of which is incorporated herein by reference in its entirety.

FIELD

The invention relates to a method of manufacturing a flange for holding an outer ring of a rolling bearing, to a holding flange obtained by this method, and to a rotational guiding assembly integrating such a holding flange.

The invention applies more particularly to holding flanges making it possible to maintain and guide an outer ring of a rolling bearing during its mounting inside a casing, for example a gearbox or motor casing, in particular an electric motor casing, of a motor vehicle. Such holding flanges do not necessarily have a function once the gearbox has been assembled.

BACKGROUND

Document FR 3032500 describes a method of assembling a holding flange in a groove of an outer ring of a rolling bearing, which groove is formed between a front surface of the ring having a first diameter and a rear surface of the ring having a second diameter greater than the first diameter. The holding flange has a bore, the diameter of which is between said first and second diameters, a mounting lug that protrudes radially inwards relative to the diameter of the bore, as well as at least one assembly member which is radially deformable between a mounting state and a mounted state. To assemble the holding flange onto the outer ring of a rolling bearing, the mounting lug is arranged in the groove, then the assembly member is deformed radially to be arranged at least partially in the groove. This assembly must absolutely preserve a functional clearance sufficient to allow movement of the bearing ring in the holding flange. In practice, this type of holding flange can be used to facilitate a blind mounting of a rolling bearing in a casing. After mounting the bearing on a shaft and the holding flange on the outer ring of the rolling bearing, the subassembly thus formed is inserted blind into a gearbox casing. Threaded rods or screws, passing through the mounting holes of a bottom plate of the casing, are screwed into threaded holes of the holding flange, and make it possible to gradually bring the flange into a final position, by indirectly exerting on the outer ring of the rolling bearing an axial force allowing the positioning, in particular the adjustment or the shrink-fitting of this outer ring in a recess provided for this purpose in the bottom plate of the casing. In this assembly phase, it is essential to provide a clearance between the rolling bearing ring and the holding flange, in order to, on the one hand, allow the bearing ring to have sufficient positioning freedom to ensure its centering in the shrink-fitting recess, and, on the other hand, allow the holding flange to have freedom of rotation guaranteeing a purely axial force on the threaded rods or the screws ensuring the mounting, in order to avoid their shearing and/or bending.

The holding flange, which has a relatively large thickness to confer good stiffness thereupon, is intended to be manufactured in a stamping step and a press-cutting step. However, it is noted that it is difficult to control the dimensions of the bore over the entire thickness of the plate, since the press-cutting is clean only over part of the thickness of the plate, and instead is more apt to tear on another part of the thickness of the plate. As a result, manufacturing and assembly tolerances do not make it possible to guarantee the desired degree of freedom of movement between the holding flange and the outer ring of a rolling bearing.

SUMMARY

The invention aims to overcome the disadvantages of the prior art and to propose a method of manufacturing a holding flange of the preceding type, in a limited number of operations, the resulting holding flange making it possible to limit the problems described above during assembly.

For this purpose, according to a first aspect of the invention, a method of manufacturing a holding flange intended to be inserted into a groove of an outer ring of a rolling bearing, from a metal plate having a plate thickness measured between a front face and an opposite rear face of the metal plate, is proposed, the method being characterized in that it comprises at least the following two steps:

- by penetration of a first tool, along a reference axis perpendicular to the plate and in a direction of penetration from the front face to an intermediate depth less than the thickness of the plate, the material initially located inside a front geometric envelope is pushed back into a volume located beyond the first tool in the direction of penetration and delimited by a blank geometric envelope, the blank geometric envelope being located, in projection on a plane perpendicular to the reference axis, inside the front geometric envelope, the front geometric envelope comprising at least two cylindrical portions centered on the reference axis, separated by at least one holding notch and one assembly notch radially protruding opposite the reference axis relative to the cylindrical portions;
- by penetration of a second tool along the reference axis and in the direction of penetration, the plate is perforated to form a final bore having a rear geometric envelope located, in projection on a plane perpendicular to the reference axis, radially inside the front geometric envelope and outside the blank geometric envelope.

In this definition and throughout the description, the blank geometric envelope, the front geometric envelope and the rear geometric envelope are three closed surfaces.

At the end of penetration by the first tool, the flange blank has, on its part located inside the front geometric envelope, between the blank geometric envelope and the front geometric envelope, a thickness corresponding to the difference between the initial thickness of the plate and the penetration depth of the first tool. The cutting of the final bore by penetration of the second tool is therefore carried out over a thickness less than the initial thickness of the plate, which makes it possible to considerably reduce the tearing effect at the end of cutting, and thus to better control the dimensions of the final bore.

The resulting holding flange has, on the periphery of the final bore, in the space between the front geometric envelope and the rear geometric envelope, a reduced thickness, corresponding to the difference between the initial thickness of the plate and the penetration depth of the first tool. This reduced thickness is preferably chosen to be strictly less than the width of the groove formed in the outer ring for which the holding flange is intended. The portion of the holding flange, the thickness of which remains equal to the initial thickness of the plate, is radially outside the front geometric envelope, and does not risk coming into contact with the outer ring of a rolling bearing in the nominal position.

For assembly-line production, the tools can be arranged on different forming stations, and the metal plates can be conveyed from one forming station to the next by any appropriate means, for example by a conveyor belt. Each station is equipped with a lower die on which the metal plate rests and is held at each forming step. The tools can be driven by any suitable means, for example by one or more mechanical or hydraulic presses. Preferably, only one and the same press bears, inter alia, the first and the second tools, which thus synchronously work on the metal plates that are conveyed from one station to another each time the press is lifted.

During the step of penetration of the first tool, the pushed material can be contained in a die facing the first tool. Alternatively, a preliminary step is provided wherein a blank tool penetrates along the reference axis in the direction of penetration from the front face, to perforate the plate and form a blank hole having as a contour the blank geometric envelope surrounding the reference axis. In this case, the material pushed back by the penetration of the first tool penetrates into the blank hole. The blank tool making it possible to perforate the plate may be a punch of any shape, for example a circular or rectangular punch, with a cross-section equal to the cross-section of the blank geometric envelope.

The metal plate is preferably rectangular.

According to one embodiment, the assembly notch of the front geometric envelope is perforated along the reference axis to form a hole and a plastically deformable assembly member located between the hole and the rear geometric envelope. The perforation is preferably carried out during the penetration step of the first tool or during the penetration step of the second tool. The assembly member formed on the notch of the front geometric envelope is then obtained without an additional step.

According to one embodiment, the rear geometric envelope comprises cylindrical portions centered on the reference axis, two of the cylindrical portions being located on either side of a first singularity of the rear geometric envelope, the first singularity being located radially in line with the holding notch, to form a tongue with a thickness smaller than the thickness of the metal plate protruding radially toward the reference axis relative to the cylindrical portions of the rear geometric envelope. The tabs will be formed in the material resulting from the step of pushing the material between the front geometric envelope and the blank geometric envelope.

According to one embodiment, the first singularity comprises connection zones between the tongue and the two cylindrical portions located on either side of the first singularity, the connection zones extending radially outside the cylindrical portions located on either side of the first singularity.

According to one embodiment, the rear geometric envelope comprises at least a second singularity located between two adjacent cylindrical portions among the cylindrical portions of the rear geometric envelope, radially in line with the assembly notch, the second singularity comprising connection zones with the two adjacent cylindrical portions, the connection zones of the second singularity extending:

radially outside the cylindrical portions of the rear geometric envelope and axially over the thickness of the rear geometric envelope, or radially outside the cylindrical portions of the rear geometric envelope and axially over the entire thickness of the holding flange.

According to a preferred embodiment, the front geometric envelope comprises in total two diametrically opposite cylindrical portions, and a holding notch and an assembly notch separating the two cylindrical portions of the front geometric envelope, the holding notch and the assembly notch being diametrically opposite.

According to one embodiment, the perforations are made by punching.

The first tool is a punch with a cross-section equal to the cross-section of the front geometric envelope. It performs a stamping which can be done hot or cold. The second tool used to perforate the plate is a cylindrical punch whose cross-section is between the cross-section of the blank geometric envelope and the cross-section of the front geometric envelope, the punch making it possible to obtain an at least partially clean cut.

According to one embodiment, mounting holes and holding holes are cut from the plate, radially outside the front geometric envelope of the plate, the holding holes serving to hold the plate during manufacturing steps. The holding holes may be located radially outside the threaded mounting holes. The threaded mounting holes allow the holding flange to be attached to the casing of the vehicle using fastening elements.

According to one embodiment, at the end of manufacture of the plate, a contour of the plate is cut, encompassing the mounting holes and situated radially inside the holding holes. The contour of the plate is cut at the end of the steps of manufacturing the flange, using a cutting tool.

According to various embodiments:
the intermediate depth is greater than one-third of the thickness of the plate; and/or
the intermediate depth is less than two-thirds of the thickness of the plate; and/or
the difference between the thickness of the plate and the intermediate depth is greater than 1 mm and less than 3 mm; and/or
the intermediate depth is greater than 1 mm and less than 3 mm; and/or
the thickness of the plate is greater than 3 mm, for example 4 mm, and less than 6 mm.

According to one embodiment, the second tool produces a sharp edge at the intermediate depth and a clean cut of the final bore over a depth of at least 0.5 mm from the sharp edge in the direction of penetration. Preferentially, the clean cut is carried out over the entire thickness of the plate.

According to various preferential sizings:
the cylindrical portions of the front geometric envelope are located at a radial distance from the final bore that is greater than 0.1 mm, and preferably greater than 0.5 mm, and less than 1.0 mm, preferably less than 0.7 mm; and/or
the cylindrical portions of the front geometric envelope are located at a radial distance from the blank geometric envelope that is greater than 1 mm, and preferably greater than 3 mm, and less than 10 mm, preferably less than 7 mm.

According to another aspect of the invention, the invention relates to a method of manufacturing a rotational guiding assembly intended to be mounted inside a casing, comprising the manufacture of a holding flange as described above, and the mounting of the holding flange in a groove of an outer ring of a rolling bearing, the groove having a front surface having a first diameter and a rear surface having a second diameter greater than the first diameter, characterized in that the tongue of the holding flange is inserted into the groove of the outer ring of the rolling bearing and in that the assembly member is plastically deformed to insert it radially and at least partially into the groove, with a clearance greater than 0.1 mm between the deformed assembly member and the bottom of the groove.

According to another aspect of the invention, the invention relates to a rotational guiding assembly intended to be mounted inside a casing, obtained by the preceding manufacturing method.

BRIEF DESCRIPTION OF THE FIGURES

Other features and advantages of the invention will emerge on reading the following disclosure, with reference to the appended figures.

For greater clarity, identical or similar elements are identified by identical reference signs in all of the figures.

DETAILED DESCRIPTION

Figure 1:
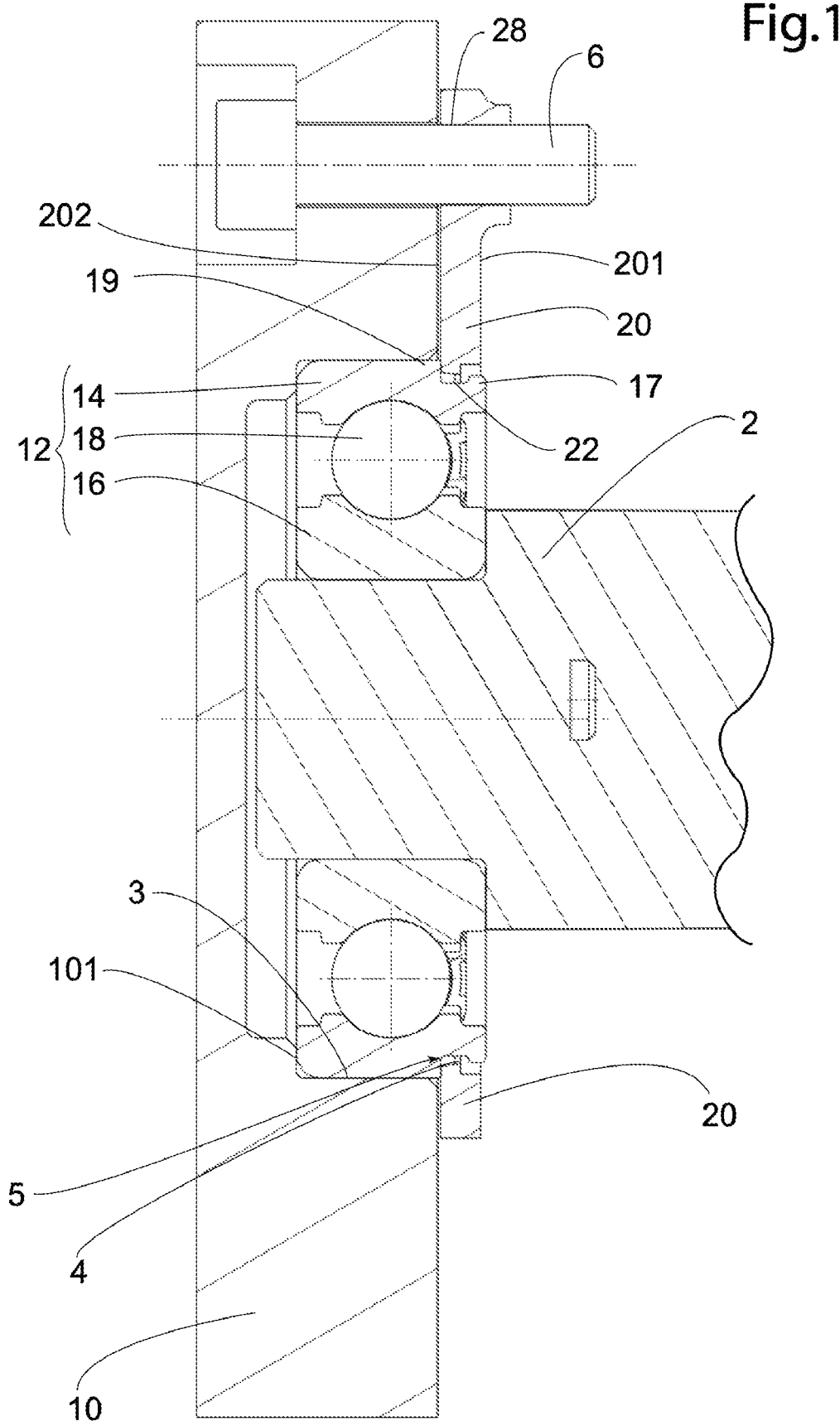
FIG. 1 is a partial representation in longitudinal cross-section of a mounting of a shaft rotating in a casing by means of a rolling bearing held in position by a holding flange according to one embodiment of the invention.

FIG. 1 shows the mounting of a primary or secondary shaft 2 in a casing 10 of a gearbox or motor, in particular an electric motor, of a motor vehicle, said mounting being carried out by means of a rolling bearing 12 comprising an outer ring 14, an inner ring 16, and rolling bodies 18 disposed between said rings 14 and 16 to allow their relative rotation. In the depicted embodiment, the inner ring 16 is rotating and shrink-fitted on the shaft 2, the outer ring 14 is fixed and shrink-fitted or press-fitted in a recess bottom 101 of a bore 3 of the casing 10. The rolling bodies 18 are here balls, but could also, for example, be conical or cylindrical rollers. The outer ring 14 comprises a groove 22 formed of a front surface 17 with a first diameter and a rear surface 19 with a second diameter strictly greater than the first diameter. The front surface 17 forms a front flank 4 of the groove 22 and the rear surface 19 forms a rear flank 5 of the groove 22, opposite the front flank 4. On the outer ring 14 is mounted a holding flange 20 comprising a front face 201 facing away from the casing 10, and a rear face 202 facing the casing 10 and the rear flank 5 of the groove 22.

To mount the rolling bearing 12 in the casing 10, the holding flange 20 is assembled in the groove 22 of the rolling bearing 12, by a method that will be described later. The assembly consisting of the holding flange 20 and the rolling bearing 12 is then shrink-fitted on an axial end of the shaft 2. The subassembly consisting of the shaft 2, the rolling bearing 12 and the holding flange 20 is then positioned axially blind at the inlet of the bore 3 of the casing 10. To insert the outer ring 14 into the recess bottom 101 of the bore 3, by shrink-fitting or with a clearance, screws 6 are used, which pass through the casing 10 and engage in mounting holes 28, which may for example be threaded holes. These screws 6, distributed around the circumference of the holding flange 20, are gradually tightened to bring the holding flange 20 closer to the casing 10 and create a contact pressure between the outer ring 14 and the recess bottom 101 of the casing 10. Incidentally, it will be noted that the holding flange 20 has, between the front face 201 and the rear face 202, a relatively large thickness, preferably greater than the width of the groove 22 between the front flank 4 and the rear flank 5, in order to give the holding flange 20 high stiffness, sufficient to transmit the assembly forces and support the forces transmitted by the shaft 2.

Figure 2A:
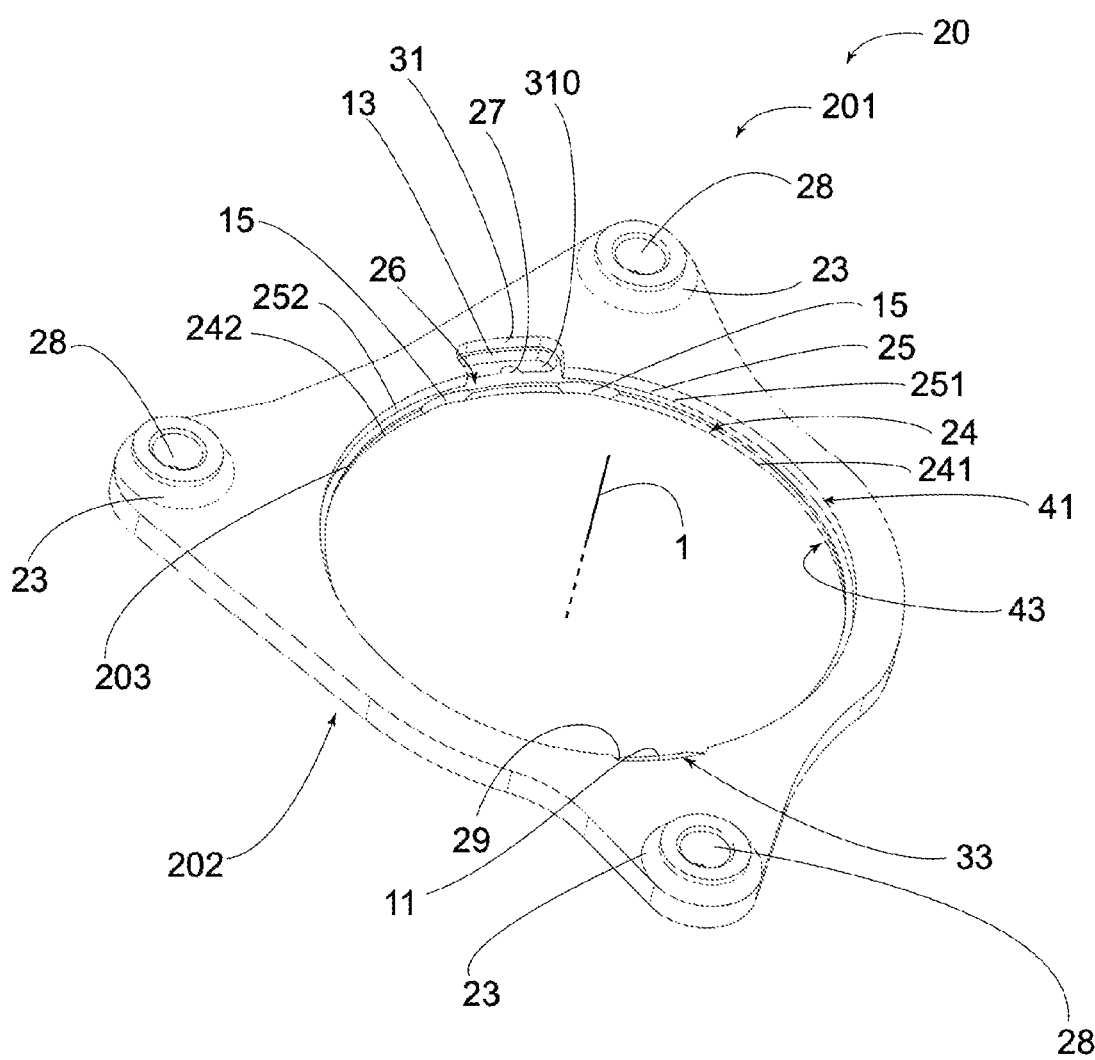
FIG. 2a and FIG. 2b represent in perspective view the two faces of the holding flange of FIG. 1.
Figure 2B:
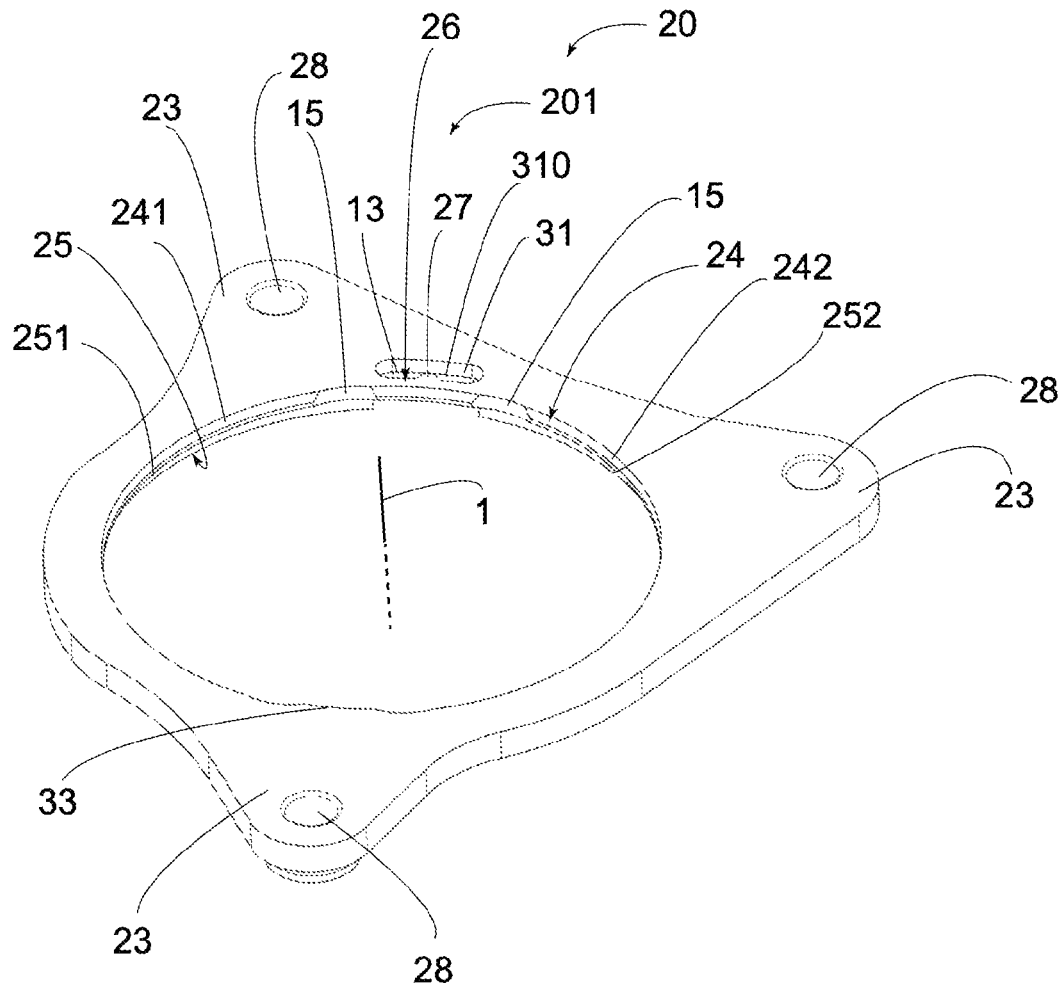

FIGS. 2a and 2b respectively show the front face 201 and the rear face 202 of the holding flange 20.

From the front face 201 of the holding flange 20 to an intermediate depth less than the total thickness of the holding flange 20, there is formed a bore 25 having as a contour a geometric envelope 41 which will be called the front geometric envelope, centered on a reference axis 1 of the flange 20. From the intermediate thickness of the holding flange 20 to the rear face 202, there is formed a bore 24 called the final bore, having as a contour a geometric envelope 43 which will be called the rear geometric envelope, centered on the reference axis 1 of the flange 20. One face 203 parallel to the front face 201 and to the rear face 202 of the holding flange 20 connects the front geometric envelope 41 and the rear geometric envelope 43.

The front geometric envelope 41 is composed of two cylindrical portions 251, 252 diametrically opposed and separated by a holding notch 29 and an assembly notch 31 that are preferably diametrically opposed. The holding notch 29, in axial projection, is U-shaped (see also FIGS. 4b and 5b), the width of the notch, measured in the radial direction, being less than its length, measured in the orthoradial direction. The assembly notch 31 is also U-shaped in axial projection, the width of the assembly notch 31 being less than its length. The holding notch 29 and the assembly notch 31 radially protrude outward from the holding flange 20.

The rear geometric envelope 43 is composed of two cylindrical portions 241, 242 that are diametrically opposed and separated by two singularities 11 and 13, the rear geometric envelope 43 being smaller than the front geometric envelope 41. The first singularity 11 is located radially in line with the holding notch 29 and the second singularity 13 is located radially in line with the assembly notch 31. Connecting zones 9 connect the cylindrical portions 241, 242 and the first singularity 11 and connecting zones 15 connect the cylindrical portions 241, 242 and the second singularity 15. The connecting zones 9 extend radially outside the cylindrical portions 241, 242 of the rear geometric envelope 43 and axially over the thickness of the rear geometric envelope 43 or over the entire thickness of the holding flange 20; and the connecting zones 15 extend radially outside the cylindrical portions 241, 242 of the rear geometric envelope 43 and axially over the thickness of the rear geometric envelope 43 or over the entire thickness of the holding flange 20. The connecting zones 9 and 15 are in the form of indentations of material, for example rounded indentations oriented radially outward from the flange 20.

In the axial extension of the holding notch 29 going to the rear face 202 of the holding flange 20, there is formed a tongue 33, and in the axial extension of the assembly notch 31 going to the rear face 202 of the holding flange 20 a hole 310 is drilled, preferably oblong, with dimensions smaller than those of the second notch 31. At the center of the edge of the oblong hole 310 that borders the rear geometric envelope 43, there preferably is a boss 27 oriented radially outward from the holding flange 20. The thickness of material located between the rear geometric envelope 43 of the flange 20 and the hole 310 of the assembly notch 31 constitutes an assembly member 26, plastically deformable between a mounting state, as shown in FIGS. 2a and 2b, and a mounted state, wherein the assembly member 26 moves radially towards the inside of the holding flange 20.

The outer contour of the holding flange 20 is formed of cylindrical portions connected by fastening tabs 23 oriented radially outward from the holding flange 20. The mounting holes 28 are in the center of the fastening tabs 23.

According to another embodiment not shown, the front geometric envelope 41 may be formed by more than two cylindrical portions separated by more than two notches, so that the holding flange 20 may comprise more than one assembly member 26, and/or more than one tongue 33.

The description below relates to a method of assembling the holding flange 20 around the outer ring 14. The holding notch 29 is inserted into the groove 22 of the outer ring 14 by the relative inclination of the final bore 24 relative to the front surface 17 of the groove 22 of the outer ring 14, to allow the tongue 33 to pass axially beyond said front surface 17. Next, the assembly method provides for radially deforming at least one assembly member 26 from the mounting state to the mounted state, to place the assembly member 26 at least partially in the groove 22, in order to ensure the assembly of the holding flange 20 by interference fit between the groove 22, the tongue 33, and the assembly member 26. Thus, as the assembly is produced by deformation of the assembly member 26, the force to be applied to the holding flange 20 remains limited in order to be able to control the assembly interference between said holding flange 20 and the outer ring 14 of the rolling bearing 12.

Figure 3A:
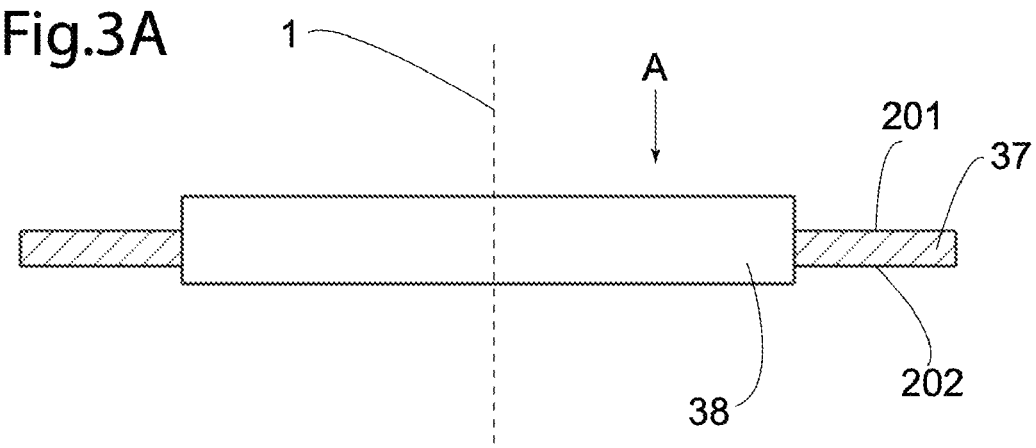
FIG. 3a and FIG. 3b respectively represent a longitudinal cross-section of a blank tool performing a preliminary manufacturing step, and a front view of the holding flange of FIGS. 2a and 2b at this preliminary manufacturing step.
Figure 3B:
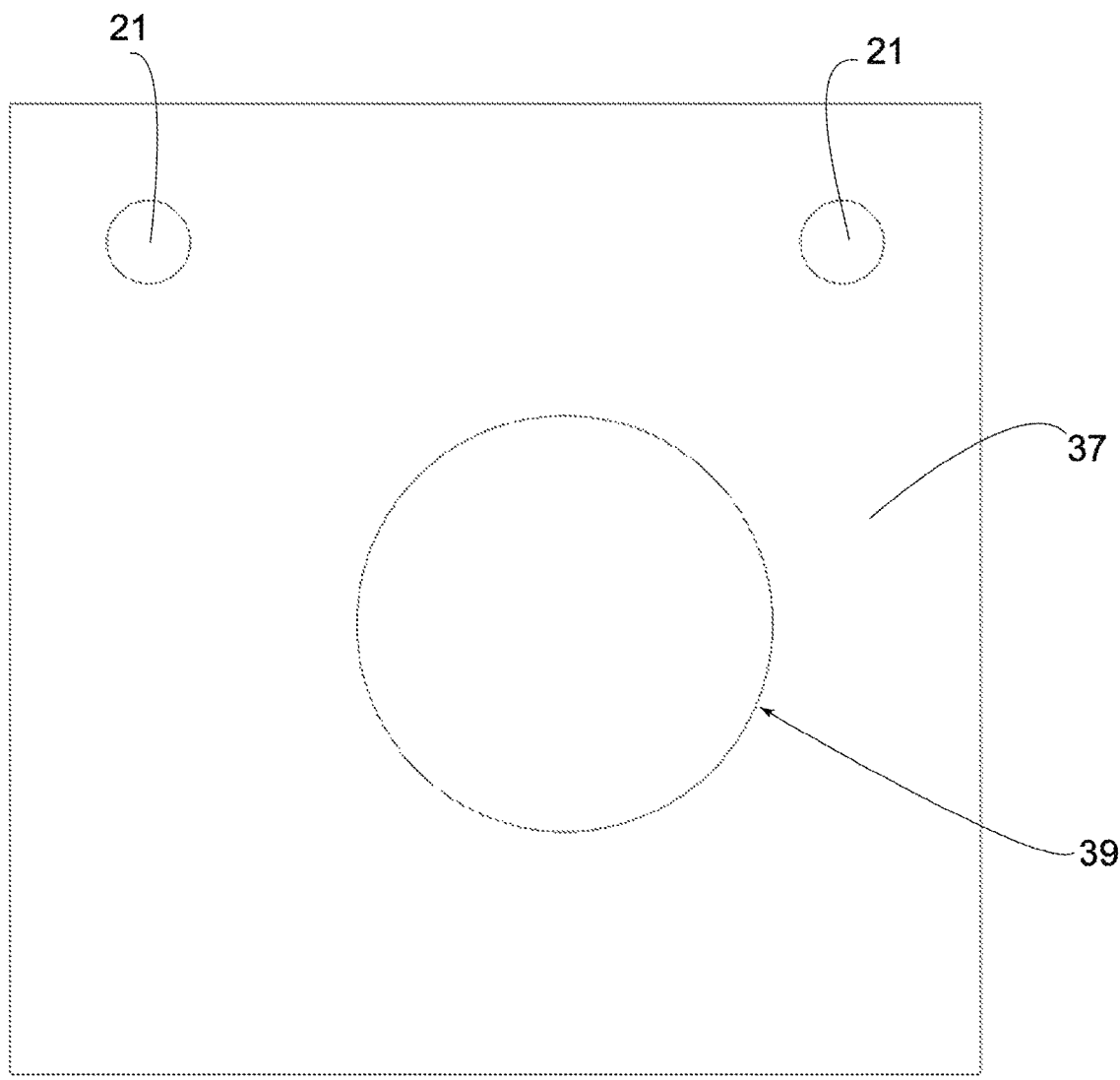

A method of manufacturing the flange 20 shown in the preceding figures will now be described. FIGS. 3a and 3b show an optional preliminary step of the method of manufacturing the holding flange 20. A metal plate 37 is placed on a lower die of a mechanical or hydraulic press and is immobilized, using fastening means inserted into holding holes 21 drilled on the contour of the plate 37. A blank punch 38, fastened on a tool holder, moves along its reference axis 1 and in a direction of penetration A, and perforates the metal plate 37 until it reaches the bottom of the lower die to form the blank geometric envelope 39. The blank punch 38 has the exterior shape of a cylindrical blank geometric envelope 39 and a diameter smaller than the dimensions of the front geometric envelope 41. According to other embodiments not shown, the blank geometric envelope 39 has any shape and dimensions, for example formed by two diametrically opposed cylindrical portions separated by two diametrically opposed notches. The metal plate 37 is of known thickness, the thickness being greater than or equal to 3 mm and less than or equal to 6 mm. According to another embodiment, the holding holes 21 are drilled at the same time as the blank geometric envelope 39.

Figure 4A:
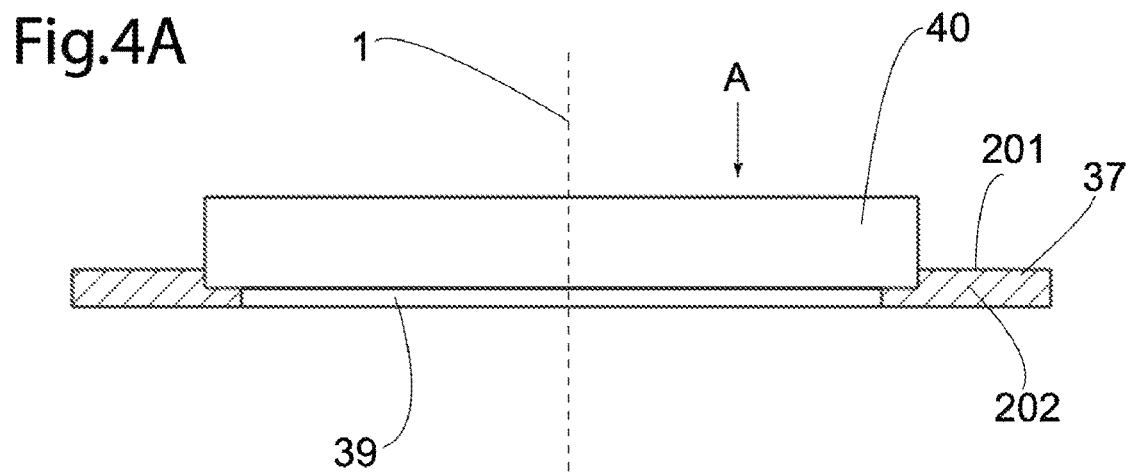
FIG. 4a and FIG. 4b respectively represent a longitudinal cross-section of a first tool performing a first manufacturing step, and a front view of the holding flange of FIGS. 2a and 2b at this first manufacturing step.
Figure 4B:
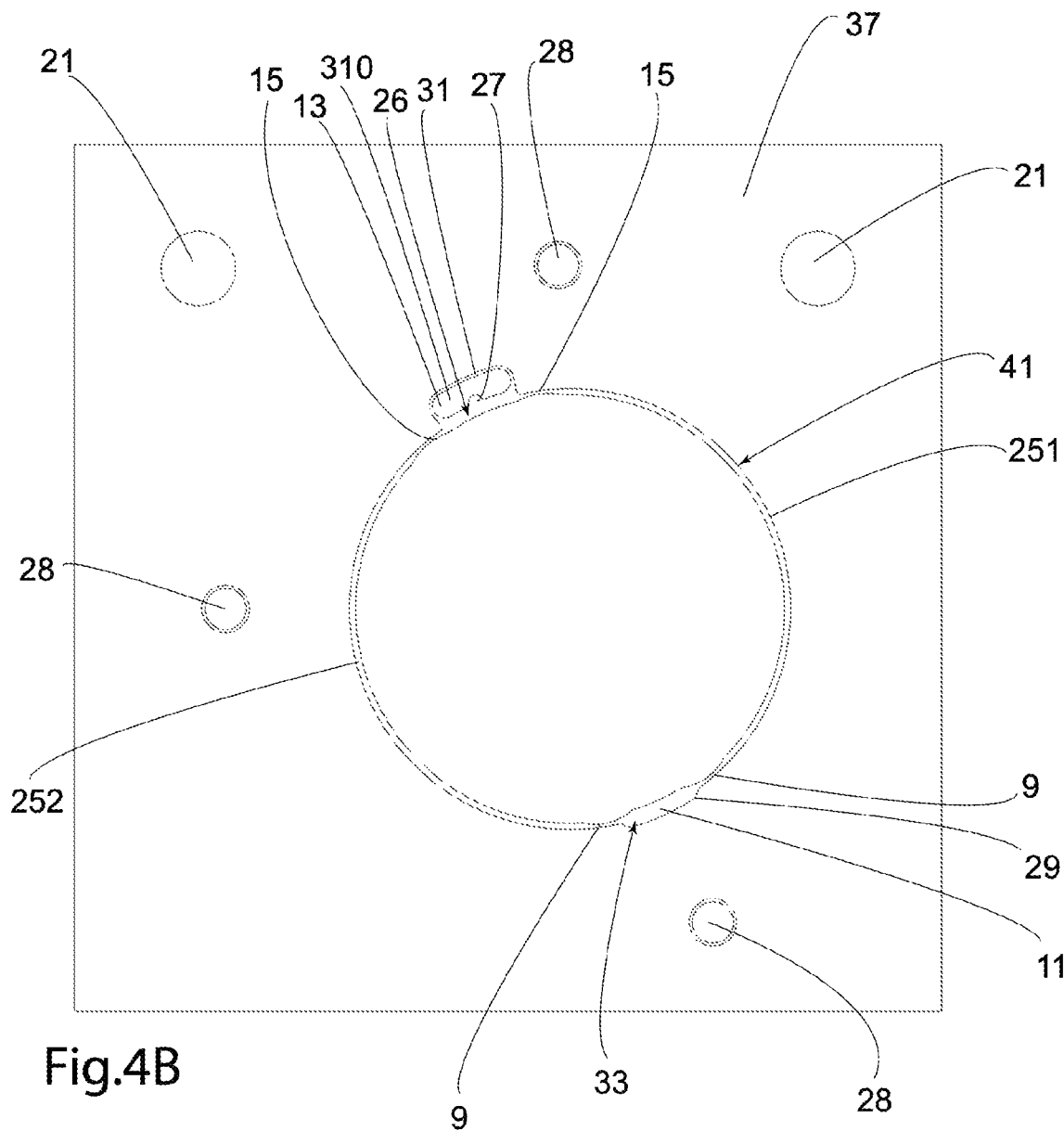

In the actual first step of the method of manufacturing the holding flange 20, shown in the FIGS. 4a and 4b, a first punch 40, fastened onto a first tool holder, moves along the reference axis 1 and in the direction of penetration A, and stamps the metal plate 37 to form an indentation of material having the front geometric envelope 41 as a contour. FIG. 4a depicts the first punch 40 partially stamping the plate 37 obtained after the step of FIG. 3b over an intermediate depth less than the thickness of the plate 37. More precisely, the intermediate depth is situated between 1 mm and 3 mm, or between one-third of the total thickness of the plate 37 and two-thirds of the total thickness of the plate 37. The first punch 40 has the exterior shape of the front geometric envelope 41. The cylindrical portions 251, 252 of the front geometric envelope 41 are located radially outside the blank geometric envelope 39, the radial distance being greater than 1 mm, and preferably greater than 3 mm, and less than 10 mm, preferably less than 7 mm. FIG. 4b shows the metal plate 37 in which the indentation obtained is formed using the first punch 40, according to the method described in FIG. 4a. During an additional step not shown, the material contained in the assembly notch 31 of the plate 37 is drilled or punched to form the oblong hole 310 and the assembly member 26. Furthermore, during this additional step, the mounting holes 28 are drilled or punched into the plate 37, radially at a distance from the front geometric envelope 41.

Figure 5A:
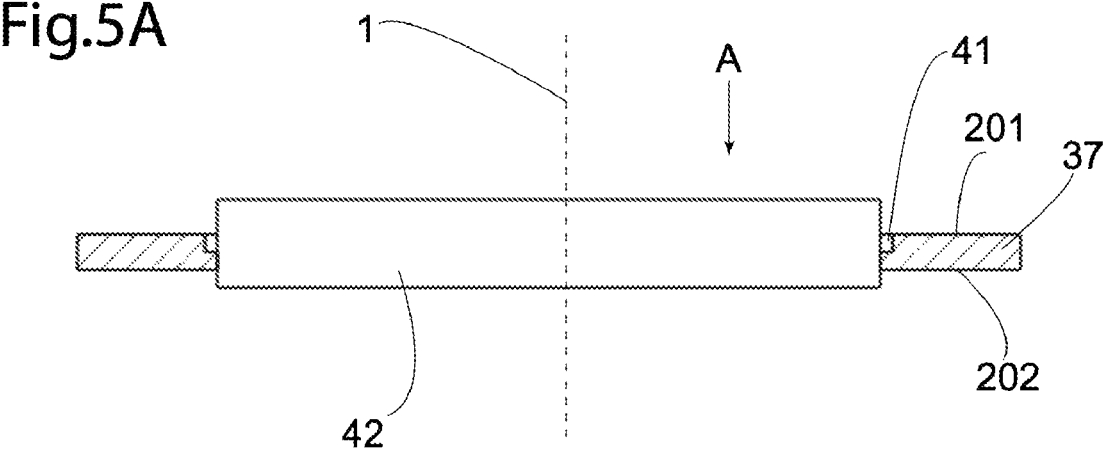
FIG. 5a and FIG. 5b respectively represent a longitudinal cross-section of tools performing a second manufacturing step, and a front view of the holding flange of FIGS. 2a and 2b at this first manufacturing step.
Figure 5B:
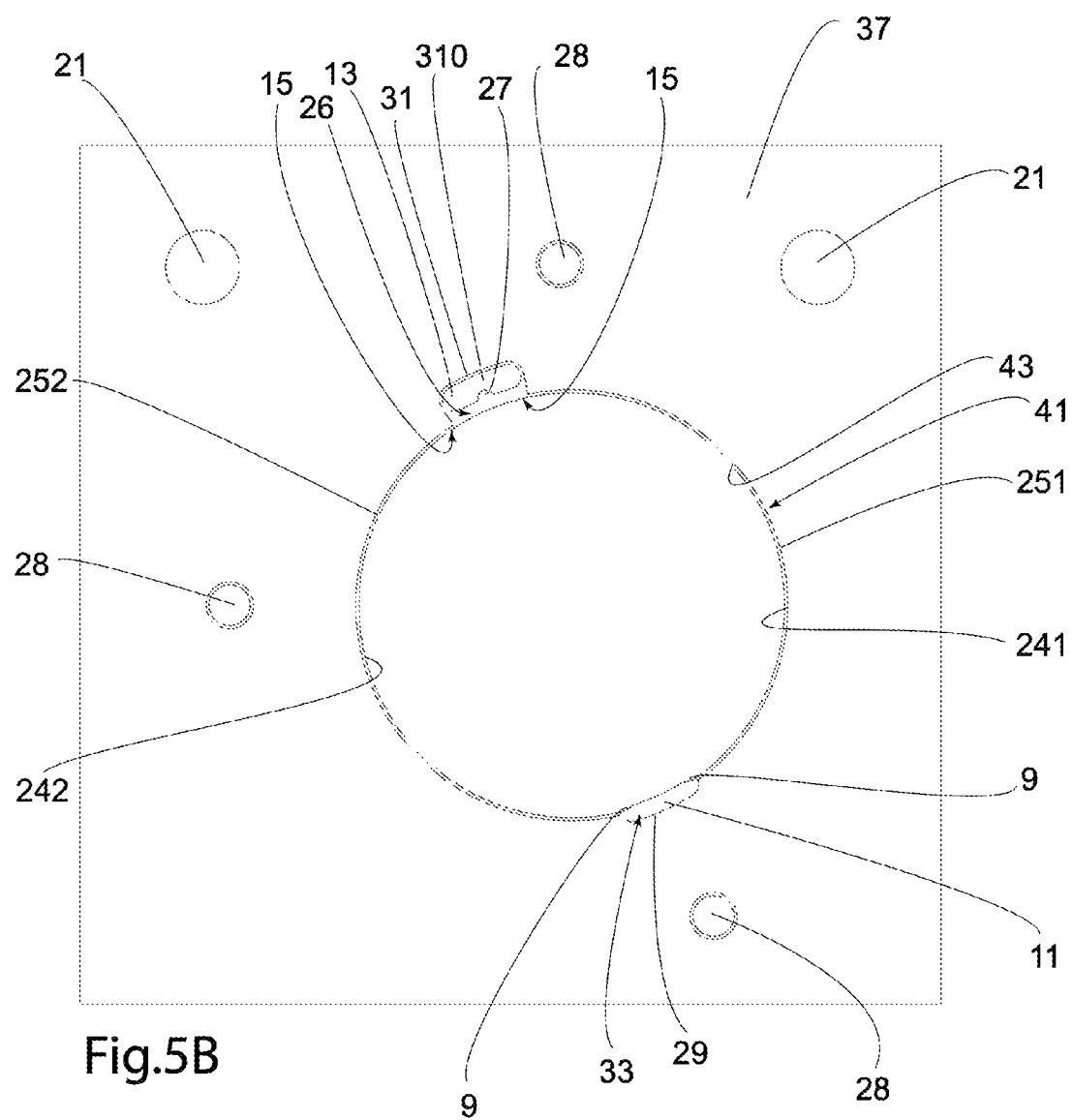

In a second step of the method of manufacturing the holding flange 20, shown in FIGS. 5a and 5b, a second punch 42, fastened on a second tool holder, moves along the reference axis 1, and perforates the metal plate 37 to form the rear geometric envelope 43. The second punch 42 performs a clean cut on at least part of the thickness of the plate 37, in particular at least 0.5 mm thick from the face 203 and in the direction of penetration A. FIG. 5a shows the second punch 42 perforating the plate 37 obtained after the step of FIG. 4a, along the reference axis 1 and in the direction of penetration A. The second punch 42 has the outer shape of the rear geometric envelope 43. The cylindrical portions 251, 252 of the front geometric envelope 41 are located radially outside the rear geometric envelope 43, at a radial distance that is greater than 0.1 mm, and preferably greater than 0.5 mm, and less than 1.0 mm, preferably less than 0.7 mm. FIG. 5b shows the metal plate 37 in which the rear geometric envelope 43 is formed using the second punch 42, according to the method described in FIG. 5a.

During a subsequent step not shown, an outer contour of the plate is formed, the contour taking the form of cylindrical portions separated by fastening tabs 23 oriented radially outward. The contour is generally located radially inside the holding holes 21 serving to hold the plate 37 on the lower dies and radially outside the mounting holes 28.

Figure 6:
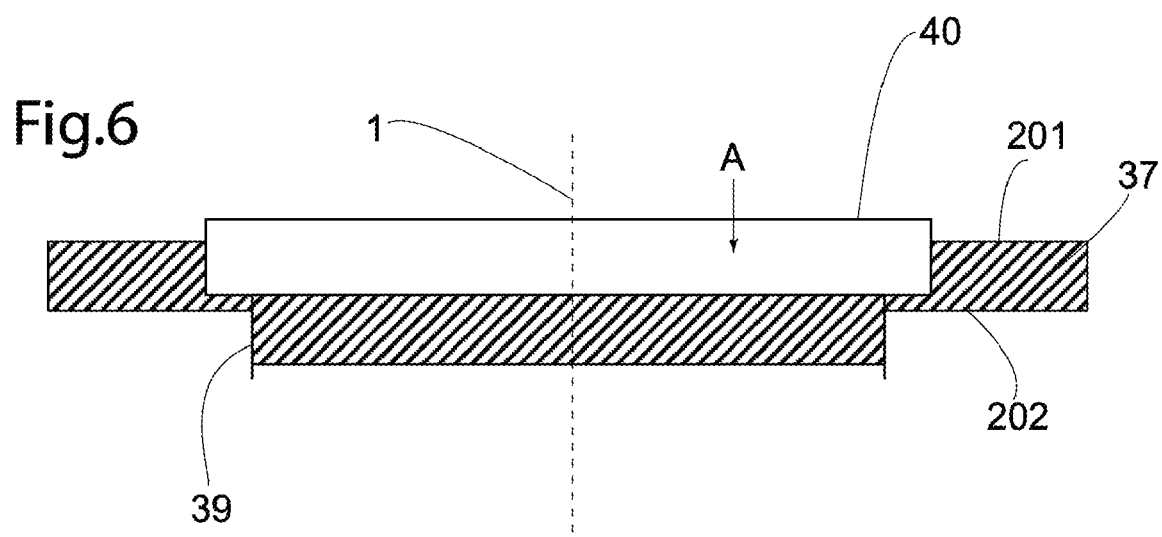
FIG. 6 represents in longitudinal cross-section a variant of the step carried out by the first tool, in the absence of a preliminary step.

FIG. 6 shows a second embodiment in two steps of the method of manufacturing the holding flange 20. During the first step, the metal plate 37 is placed on a hollow lower die 44 having a cavity for collecting material, the cavity having a depth greater than the axial distance between the intermediate thickness of the metal plate 37 and the rear face 202 of the metal plate 37. The hollow lower die has as a contour the blank geometric envelope 39. The first punch 40, fastened on a first tool holder, moves along the reference axis 1, and stamps the plate 37 along the intermediate depth by moving the material located inside the front geometric envelope 41 inside the cavity of the lower hollow die in order to form an indentation of material on the intermediate thickness of the plate, the indentation having for as a contour the front geometric envelope 41, and a volume of material pushed from the intermediate thickness of the plate 37 in the cavity of the hollow lower die, the volume of material having as a contour the blank geometric envelope 39.

During the second step of the second embodiment, similar to the preceding embodiment, the second punch 42, having the rear geometric envelope 43 as its contour, moves along the reference axis 1, and perforates the metal plate 37 to form the rear geometric envelope 43 of the metal plate 37 as shown in FIG. 5b.

According to another embodiment not shown, the three punches 38, 40, 42 are located on three tool holders belonging to three different presses.

Naturally, the examples shown in the figures and discussed above are provided for illustrative and non-limiting purposes only. It is explicitly provided that it is possible to combine the various illustrated embodiments in order to provide others.

It is emphasized that all of the features, as they are taught to the person skilled in the art from the present disclosure, drawings and attached claims, even though specifically they have only been described in relation to other determined features, both individually and in any combinations, may be combined with other features or feature groups disclosed herein, as long as not expressly excluded and no technical circumstances make such combinations impossible or nonsensical.

The invention claimed is:

1. A method of manufacturing a holding flange intended to be inserted into a groove of an outer ring of a rolling bearing, from a metal plate having a plate thickness measured between a front face and an opposite rear face of the metal plate, the method being wherein it comprises at least the following two steps:
    by penetration of a first tool, along a reference axis perpendicular to the plate and in a direction of penetration from the front face over an intermediate depth less than the plate thickness, material initially located inside a front geometric envelope is pushed back into a volume located beyond the first tool in the direction of penetration and delimited by a blank geometric envelope, the blank geometric envelope being located, in projection on a plane perpendicular to the reference axis, inside the front geometric envelope, the front geometric envelope comprising at least two cylindrical portions centered on the reference axis, separated by at least one holding notch and an assembly notch radially protruding opposite the reference axis relative to the cylindrical portions;
    by penetration of a second tool along the reference axis and in the direction of penetration, the plate is perforated to form a final bore having a rear geometric envelope located, in projection on a plane perpendicular to the reference axis, radially inside the front geometric envelope and outside the blank geometric envelope.

2. The manufacturing method of claim 1, comprising a preliminary step wherein a blank tool penetrates along the reference axis in the direction of penetration from the front face, to perforate the plate and form a blank hole having as a contour the blank geometric envelope surrounding the reference axis.

3. The manufacturing method of claim 1, wherein the assembly notch of the front geometric envelope is perforated along the reference axis to form a hole and a plastically deformable assembly member between the hole and the rear geometric envelope.

4. The manufacturing method of claim 1, wherein the front geometric envelope comprises in total two cylindrical portions that are diametrically opposed, and a holding notch and an assembly notch separating the two cylindrical portions of the front geometric envelope, the holding notch and the assembly notch being diametrically opposed.

5. The manufacturing method of claim 1, wherein the perforations are made by punching.

6. The manufacturing method of claim 1, wherein the material is pushed back by stamping.

7. The manufacturing method of claim 1, wherein:
    the intermediate depth is greater than one-third of the thickness of the plate; and/or
    the intermediate depth is less than two-thirds of the thickness of the plate; and/or
    a difference between the thickness of the plate and the intermediate depth is greater than 1 mm and less than 3 mm; and/or
    the intermediate depth is greater than 1 mm and less than 3 mm; and/or
    the thickness of the plate is greater than 3 mm, for example 4 mm, and less than 6 mm.

8. The manufacturing method of claim 1, wherein the second tool produces a sharp edge at the intermediate depth and a clean cut of the final bore over a depth of at least 0.5 mm from the sharp edge in the direction of penetration.

9. The manufacturing method of claim 1, wherein:
    the cylindrical portions of the front geometric envelope are located at a radial distance from the final bore that is greater than 0.1 mm and less than 1.0 mm; and/or
    the cylindrical portions of the front geometric envelope are located at a radial distance from the blank geometric envelope that is greater than 1 mm and less than 10 mm.

10. The manufacturing method of claim 1, wherein, radially outside the front geometric envelope of the plate, mounting holes and holding holes are cut from the plate, the holding holes being used to hold the plate during the steps.

11. The manufacturing method of claim 10, wherein, at an end of manufacture of the plate, a contour of the plate is cut that encompasses the mounting holes and is located radially inside the holding holes.

12. The manufacturing method of claim 1,
    wherein the assembly notch of the front geometric envelope is perforated along the reference axis to form a hole and a plastically deformable assembly member between the hole and the rear geometric envelope; and
    wherein the rear geometric envelope comprises cylindrical portions centered on the reference axis, two of the cylindrical portions being located on either side of a first singularity of the rear geometric envelope, the first singularity being located radially in line with the holding notch, to form a tongue of less thickness than the thickness of the metal plate protruding radially toward the reference axis relative to the cylindrical portions of the rear geometric envelope.

13. A method of manufacturing a rotational guiding assembly intended to be mounted inside a casing, comprising:
    manufacturing a holding flange by the method of claim 12, and
    mounting the holding flange in a groove of an outer ring of a rolling bearing, the groove having a front surface that has a first diameter and a rear surface that has a second diameter greater than the first diameter,
    wherein the tongue of the holding flange is inserted into the groove of the outer ring of the rolling bearing and
    wherein the assembly member is plastically deformed to insert the assembly member radially and at least partially into the groove, with a clearance greater than 0.1 mm between the deformed assembly member and a bottom of the groove.

14. The manufacturing method of claim 1, wherein the rear geometric envelope comprises cylindrical portions centered on the reference axis, two of the cylindrical portions being located on either side of a first singularity of the rear geometric envelope, the first singularity being located radially in line with the holding notch, to form a tongue of less thickness than the thickness of the metal plate protruding radially toward the reference axis relative to the cylindrical portions of the rear geometric envelope.

15. The manufacturing method of claim 14, wherein the rear geometric envelope comprises at least a second singularity located between two adjacent cylindrical portions among the cylindrical portions of the rear geometric envelope, radially in line with the assembly notch, the second singularity having connecting zones with the two adjacent cylindrical portions, the connecting zones of the second singularity extending:
   radially outside the cylindrical portions of the rear geometric envelope and axially over the thickness of the rear geometric envelope, or;
   radially outside the cylindrical portions of the rear geometric envelope and axially over an entire thickness of the holding flange.

16. The manufacturing method of claim 14, wherein the first singularity comprises connecting zones between the tongue and the two cylindrical portions located on either side of the first singularity, the connecting zones extending radially outside the cylindrical portions located on either side of the first singularity.

17. The manufacturing method of claim 16, wherein the rear geometric envelope comprises at least a second singularity located between two adjacent cylindrical portions among the cylindrical portions of the rear geometric envelope, radially in line with the assembly notch, the second singularity having connecting zones with the two adjacent cylindrical portions, the connecting zones of the second singularity extending:
   radially outside the cylindrical portions of the rear geometric envelope and axially over the thickness of the rear geometric envelope, or;
   radially outside the cylindrical portions of the rear geometric envelope and axially over an entire thickness of the holding flange.

\* \* \* \* \*